United States Patent [19]
Rossi et al.

[11] 4,108,612
[45] Aug. 22, 1978

[54] DERIVATIZED ETHYLENE/POLAR MONOMER POLYMERS OF IMPROVED PERFORMANCE

[75] Inventors: Albert Rossi, Warren; Harold N. Miller, Millington, both of N.J.

[73] Assignee: Exxon Research & Engineering Co., Linden, N.J.

[21] Appl. No.: 784,121

[22] Filed: Apr. 4, 1977

[51] Int. Cl.² .................................................. C10L 1/14
[52] U.S. Cl. ............................................ 44/62; 44/70
[58] Field of Search ........................................ 44/62, 70

[56] References Cited
U.S. PATENT DOCUMENTS

| | | | |
|---|---|---|---|
| 3,449,251 | 6/1969 | Tunkel et al. | 44/70 |
| 3,773,478 | 11/1973 | Feldman | 44/62 |
| 3,792,983 | 2/1974 | Tunkel et al. | 44/62 |
| 3,966,428 | 6/1976 | Rossi | 44/62 |

*Primary Examiner*—Winston A. Douglas
*Assistant Examiner*—Mrs. Y. Harris-Smith
*Attorney, Agent, or Firm*—Roland A. Dexter; Frank T. Johmann

[57] ABSTRACT

Middle distillate oils are improved with respect to flow and pour point by incorporating therein halogenated polymers comprised of ethylene and free radical polymerizable monomers containing polar groups. The halogenated ethylene-polar monomer copolymers are found to be more effective flow improvers and pour depressants than non-halogenated ethylene-polar monomer copolymers. Preferred polymeric additives include the ethylene-isobutyl acrylate copolymers and the ethylene-vinyl acetate copolymers containing from about 5 to about 25 wt.% chlorine.

9 Claims, No Drawings

DERIVATIZED ETHYLENE/POLAR MONOMER POLYMERS OF IMPROVED PERFORMANCE

BACKGROUND OF THE INVENTION

1. Field of the Invention

The present invention relates to improving the flow and pour point characteristics of middle distillate fuels. More particularly, the present invention relates to the preparation of hydrocarbon fuels, in particular heating oils and diesel fuels, with improved low temperature handling characteristics.

2. Description of the Prior Art

In storage and use of heavy oils, such as lubricating oils, problems associated with pour point have long been in existence and have been recognized in the art. The pour point of an oil is defined as the lowest temperature at which the oil will pour or flow when chilled without disturbance under specified conditions. Recently, it has been discovered that pour point problems also exist in the storage and use of petroleum fuel oils, particularly at low temperatures. Pour point problems arise through the formation of solid or semi-solid waxy particles within an oil composition. For example, in the storage of furnace oils or diesel oils during the winter months, temperatures may decrease to a point as low as −15° to −40° F. The decreased temperatures often cause crystallization and solidification of wax in the distillate fuel oil.

The low temperature properties of petroleum distillate fuels boiling in the range between about 250° and about 800° F. have become important in recent years because of the growth of markets of such fuels in sub-arctic areas. The increases in the use of hydrocarbon fuels of all kinds in areas frequently subjected to low temperatures have presented serious problems because of the poor cold characteristics of these fuels. Particularly serious problems have been encountered in the use of oils and diesel and jet fuels that have too high a pour point, resulting either in distributing or operating difficulties or both. For example, the distribution of heating oils by pumping or siphoning is rendered difficult or impossible at temperatures around or below the poor point of the oil. Further, the flow of the oil at such temperatures through the filters cannot be maintained, leading to the failure of the equipment to operate.

It is well known in the art to use various mixtures and additives in order to lower the pour point of oils. For example, a wide variety of compounds has been found to be effective as pour point depressants for lubricating oils. Among the best known are those prepared either by condensing aromatic compounds with long chain paraffins, or by condensing olefinic esters. It is generally considered that these pour depressants are effective because as an additive-containing oil is cooled, the hydrocarbon chain of the additive becomes incorporated into the crystal lattice of the separated wax, while the other part of the pour point depressant molecule prevents the crystals from adhering together to form a gel structure. It has, however, been found that such known pour point depressants generally have little or no effect in oils of the middle distillate boiling range. The failure of these additives to be effective in middle distillates may at least in part be due to the basic difference in the composition between the wax in lubricating oils and that in middle distillate fuels.

Middle distillate fuels have been found to be responsive to such materials as terpolymers derived from ethylene-propylene and a $C_1$–$C_{12}$ alkyl ester of acrylic acid or methacrylic acid or mixtures thereof (see U.S. Pat. No. 3,447,915) and halogenated polymers of ethylene and $C_3$–$C_{18}$ alpha-olefins.

U.S. Pat. No. 3,961,916 teaches that the low temperature flow characteristics of petroleum middle distillates can be very satisfactorily controlled by the proper choice of a combination of a nucleating agent or wax growth stimulator and a wax crystal growth arrester. This was based on discovery that depending on its composition and physicochemical characteristics such as molecular weight and branchiness, a polymeric wax crystal modifier can essentially operate as a nucleator or as a growth arrester for wax crystals. According to this patent, one convenient way of achieving this in a most effective way is to add a separate polymeric additive to effect each of the separate functionalities desired.

SUMMARY OF THE INVENTION

It has now been found, in accordance with this invention, that the pour point of a middle distillate oil may be improved by incorporating therein halogenated copolymers of ethylene and free radical polymerizable monomers containing polar groups.

According to this invention, an improved pour depressant and flow improver is formed from a random ethylene-polar monomer copolymer which has been halogenated to a halogen content ranging from about 5 to about 25 wt.% halogen, preferably 10 to 22 wt.% halogen. The halogen-containing polymer of this invention may be a fluoride, iodide, bromide, or a chloride. It is preferred, however, that the polymer be a chloride.

DETAILED DESCRIPTION OF THE INVENTION

Ethylene and a free radical polymerizable polar comonomer are copolymerized to prepare the additive of this invention. The polar free radical polymerizable comonomer is selected from the group consisting of:

(a) vinyl carboxylates, acrylates, α-alkyl acrylates, itaconates, maleates, and fumarates, all of the general formula

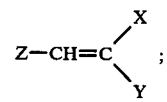

wherein:

Z is a hydrogen atom, —OOCR, —COOR′, OR′ or SR′ group;

X is a hydrogen atom, $C_1$ to $C_{18}$, preferably $C_1$ to $C_8$, hydrocarbyl, preferably alkyl, —OOCR, or a —COOR′ group;

Y is a —OOCR, —CH₂COOR′, or —COOR′ group;

R is a hydrogen atom or a $C_1$ to $C_{18}$, preferably $C_1$ to $C_8$ hydrocarbyl, preferably alkyl group; and R′ is a $C_1$ to $C_{18}$, preferably $C_1$ to $C_8$ hydrocarbyl, preferably alkyl group;

(b) carbon monoxide; and (c) carboxylic acid anhydrides of the formula

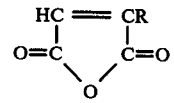

wherein R is as defined hereinabove.

In a preferred embodiment of this invention, the polar comonomer is a vinyl alcohol carboxylic acid ester of the formula:

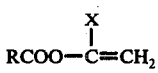

wherein R is the same as R above and X is the same as above and preferably is hydrogen. Specific examples of such esters are vinyl acetate, vinyl butyrate, vinyl octanoate, vinyl 1, -dimethyl heptanoate, vinyl benzoate, vinyl laurate, 2-propenyl acetate, vinyl myristate, vinyl palmitate and the like. A preferred vinyl ester is vinyl acetate.

In another embodiment of this invention, the polar comonomer is an acrylate ester of the general formula:

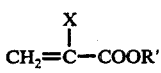

wherein X is as noted directly above, and preferably is hydrogen or a methyl group and R' is the same as above. Suitable examples of such acid esters are methylacrylate, isobutyl acrylate, 2-ethyl hexyl acrylate, phenylacrylate, methyl alpha-methacrylate, laurylacrylate, lauryl methacrylate, palmityl alcohol ester of alpha-methyl-acrylic acid, $C_{13}$ Oxo alcohol esters of methacrylic acid and the like.

In a further preferred embodiment of this invention the polar comonomer is an unsaturated polycarboxylic acid ester of the formula:

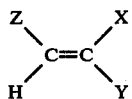

wherein at least 2 of X, Y and Z are —COOR' groups while the other is a hydrogen atom, or R'. Diesters of $C_4$ dicarboxylic acids are especially preferred. Specific examples of such compounds are di-(2-ethylhexyl) fumarate, ethyl methyl fumarate, lauryl methyl fumarate, di-lauryl fumarate, dimethyl maleate, di-isopropyl maleate, di-$C_{13}$ Oxo fumarate, di(octadecyl) maleate, 1,1,2-tris(carboxyethyl) ethylene, diethyl-tetrapropenyl maleate, and the like.

One or more of the above polar comonomers can be copolymerized with ethylene. For example, terpolymers, such as terpolymers of ethylene-vinyl acetate-isobutyl acrylate, can be formed. Thus, the polar comonomer can be a single monomer or a mixture of such monomers in any proportion.

There are many alternate methods that are available to obtain the copolymers of this invention. The present invention, therefore, is not dependent on any particular method of preparing the above copolymers. Methods for the preparation of the above copolymers are well known to those skilled in the art. For example, the polymers of this invention may be conveniently prepared by well-known solvent polymerization techniques or emulsion polymerization techniques.

A typical free radical initiated solvent copolymerization for forming the copolymers of this invention is as follows: Solvent and 0–50 wt.% of the total amount of polar comonomer used in the batch are charged to a stainless steel pressure vessel which is equipped with a stirrer. The temperature of the pressure vessel is then brought to the desired reaction temperature, e.g., 70° to 250° C., and the vessel is pressured to the desired pressure with ethylene, e.g., 800 to 10,000 psig., usually 900 to 6,000 psig. Then promoter, usually dissolved in solvent so that it can be pumped, and additional amounts of the polar comonomer are added to the vessel continuously, or at least periodically, during the reaction time. Continuous addition gives a more homogeneous copolymer product as compared to adding all the comonomer at the beginning of the reaction.

As ethylene is consumed in the polymerization reaction, additional ethylene is supplied through a pressure controlling regulator to maintain the desired reaction pressure fairly constant at all times. The reaction is normally carried out for a total reaction time of one-fourth (¼) to 10 hours. Following the completion of the reaction, the liquid phase of the pressure vessel is distilled to remove the solvent and other volatile constituents of the reacted mixture, leaving the polymer as residue. Usually, to facilitate handling and later oil blending, the polymer is dissolved in a light mineral oil to form a concentrate usually containing 10 to 60 wt.% polymer.

Usually, based upon 100 parts by weight of copolymer to be produced, about 50 to 1200, preferably 100 to 600, parts by weight of solvent and about 5 to 20 parts by weight of promoter are used. The solent is preferably an inert hydrocarbon solvent such as benzene, hexane, cyclohexane, and the like. The promoter can be any of the conventional free radical promoters, such as peroxide or azo-type promoters, including the acyl peroxides of $C_2$ to $C_{18}$ branched or unbranched carboxylic acids, as well as other common promoters. Specific examples of promoters include di-benzoyl peroxide, di-tertiary butyl peroxide, di-tertiary butyl perbenzoate, tertiary butyl hydroperoxide, alpha, alpha', azo-diisobutyronitrile, di-lauroyl peroxide, and the like.

A suitable emulsion polymerization technique that can be employed in the practice of the present invention is described in U.S. Pat. No. 3,887,610 granted June 3, 1975. Briefly, the process described therein comprises forming an aqueous emulsified system comprising water, a polar comonomer (such as vinyl acetate), a water-soluble free radical initiator, an emulsifier and a chain transfer agent. Ethylene is introduced into the system as a gas under pressure. The system is constantly agitated and thermostated until the desired copolymer number average molecular weight is reached. The copolymer is then recovered by standard techniques. The chain transfer agents are chosen from the group consisting of $C_1$ to $C_{30}$ hydrocarbyl mercaptans and $C_1$ to $C_4$ haloalkanes and are present in the amount of 0.005 to 0.25 mole per mole of polar comonomer.

Typically, the ethylene-polar monomer copolymer of this invention will have a number average molecular weight ($\overline{M}_w$), prior to halogenation, of about 1500 to about 20,000, preferably 3500 to 15,000. Unless otherwise specified, the term "molecular weight" as used herein means molecular weight based on vapor phase osmometry measurement. The copolymers of this invention may be further described as containing (prior to halogenation) from about 70 to about 97, preferably 75 to 95 mole % of ethylene.

Halogenation of the ethylene-polar monomer copolymer is carried out in accordance with well-known techniques. The halogenation reaction is carried out by treating the copolymer with a halogenating agent such as chlorine, bromine, iodine, dichloro-dimethylhydantoin, N-bromosuccinimide, and the like, with chlorine preferred. Fluorine itself generally is not used because it has a tendency to tear the copolymer apart. Mild fluorinating agents such as, for example, calcium fluoride, can be used to fluorinate the copolymer. Halogenation conditions can be varied widely and are not critical. In general, temperatures of from $-20°$ to $150°$ C. can be used, depending on the activity of the halogenating agent employed. When chlorine is used as the halogenating agent, temperatures of from $40°$ to $150°$ C., preferably $70°$ to $120°$ C., and a reaction time of from about one minute to one hour are utilized. Pressures of from atmospheric to 25 atmospheres are employed. In general, the quantity of halogenating agent is chosen to be sufficient to provide halogenated copolymers having from 5 to 25 weight percent, preferably 10 to 22 weight percent halogen therein.

The ethylene/polar monomer copolymers of interest are those with 70 mole % ethylene or higher. These will have long sequences of ethylene units or a longer number of crystalline regions. These crystalline sites reduce the solubility of the copolymer (and hence its pour depressing ability) in middle distillates. Random halogenation of the copolymer reduces the number of crystalline sites and the resulting product exhibits more pour depressing activity.

Random halogenation will introduce halogen into the copolymer at a number of sites (e.g., the primary, secondary and tertiary hydrogens replaced by halogen). Each copolymer (ethylene/vinyl acetate, ethylene/alkyl acrylate, etc.) will incorporate halogens at different rates and at different sites. Therefore, there is an optimum halogen content for each copolymer within the preferred range of about 10 to 22 wt.% based on the total weight of the halogenated ethylene copolymer.

The halogenation reaction can be carried out in the liquid phase by thermal initiation or by photochemical initiation. Photochemical initiation involves the use of ultraviolet light which accelerates the rate of reaction and thus requires lower temperatures and results in better halogen utilization. In a typical halogenation method, chlorine or bromine gas, either with or without nitrogen dilution, is introduced intimately into a solution of the unhalogenated copolymer and inert solvent until the desired amount of chlorination or bromination has been achieved. Suitable inert solvents include benzene, ethylene dichloride, carbon tetrachloride, chlorobenzene, and the like. Typically, solutions containing from about 1 to about 20 wt.% of the polymer are exposed to ultraviolet light at a temperature within the range between about $-20°$ to $+50°$ C.

The halogenated copolymer can be isolated from the halogenation reaction mixture by the addition of an alcohol or a ketone to the reaction mixture to precipitate the halogenated copolymer. The precipitated halogenated copolymer is filtered from the liquid portion and dried. Suitable alcohols include aliphatic alcohols having from 1 to 4 carbon atoms per molecule. Methanol is a preferred alcohol. Suitable ketones useful in the isolation procedure contain from 3 to 8 carbon atoms per molecule. Acetone is a preferred ketone. From 0.5 to 5, preferably from 1 to 2 volumes of alcohol or ketone are added, based on the volume of the halogenation reaction mixture. However, this technique results in most of the catalyst residues remaining in the halogenated copolymer unless they were previously removed prior to the halogenation step.

Alternatively, isolation can be achieved by washing the reaction mixture followed by removal of most of the solvent by steam stripping. This technique has economic and operation advantages in that only water is used to isolate the halogenated copolymer. This technique involves first washing the halogenation reaction mixture with a large volume of water, e.g., from 1 to 5 volumes based on the volume of the reaction mixture. The inert aromatic solvent is then steam stripped off, leaving the halogenated copolymer as a slurry in water, which is then filtered and dried in conventional drying equipment such as tunnel driers, tray driers, and degassing dewatering extruders.

In general, the middle distillate fuels of this invention have atmospheric boiling points within the range between about $325°$ and $800°$ F. The fuel oil can comprise straight run or virgin gas oil or cracked gas oil or a blend in any proportion of straight run and thermally and/or catalytically cracked distillates. Thus, the fuel oil may contain cracked components, such as, for example, those derived from cycle oils or cycle oil cuts boiling heavier than gasoline, usually in the range of from about $450°$ to about $750°$ F. High-sulfur-containing and low-sulfur-containing oils such as diesel oils and the like may also be used.

Specific examples of middle distillate fuel materials include, among others, virgin gas oils, heating oils, cracked gas oils and diesel fuel oils. Virgin gas oils will normally boil in the range of from about $350°$ to $700°$ F.

Heating oils will normally have boiling ranges between about $325°$ and about $750°$ F. and are more fully described in ASTM Specification D-396-48T and supplements thereto. A representative heating oil specification calls for a 10% distillation point no higher than about $440°$ F., a 50% point no higher than about $520°$ F., and a 90% point of at least $540°$ F. and no higher than about $640°$ to $650°$ F., although some specification set the 90% point as high as $675°$ F.

Diesel fuels in which the polymers may be employed are described in detail in ASTM Specification D-975-35T and later versions of the same specification. A representative specification for a diesel fuel includes a minimum flash point of $100°$ F. and a 90% distillation point between $540°$ and $640°$ F. (See ASTM Designations D-496 and D-975). The low temperature flow problem is most usually encountered with diesel fuels and with heating oils.

When used in distillate fuel oils to improve their flow properties, the copolymers of this invention are employed as additives and are mixed with such oils in flow-improving concentrations of about 0.005 to about 2.5 wt.%, preferably between about 0.01 and about 0.15 wt.%, based on the particular middle distillate being treated, so as to accomplish the desired objects. It is to be understood that such ranges are flexible and will be determined by the particular character of the composition to which the additive is added. Typically such polymeric additives are sold as concentrates in which the additive is combined with a hydrocarbon solvent in amounts ranging from 15 to 90, preferably 30 to 55 wt.% additive based on the total amount of the solvent and additive present. Typical hydrocarbon solvents include, among others, mineral oils, hexane, heptane and the like.

The polymeric pour depressants may, in accordance with the invention, be employed in conjunction with a variety of other additives commonly used in fuels such as those set forth hereafter. Typical of such additives are rust inhibitors, anti-emulsifying agents, corrosion inhibitors, antioxidants, dispersants, dyes, dye stabilizers, haze inhibitors, anti-static agents and the like. It will frequently be found convenient to prepare additive concentrates for use in the various types of fuels and thus add all of the additives simultaneously.

For a clearer understanding of the invention, specific examples of it are set forth below. These examples are merely illustrative and are not to be understood as limiting the scope and underlying principles of the invention in any way.

EXAMPLE 1

An ethylene-isobutyl acrylate copolymer sold under the trade name Zetafax 1270 by Dow Chemical Company, Midland, Mich., is chlorinated. The copolymer has a molecular weight of 9031 and contains 20% by weight of isobutyl acrylate. The copolymer is chlorinated as follows: 8 grams of the copolymer and 200 ml of carbon tetrachloride are placed in a 500 ml flask equipped with a mechanical stirrer, heating mantle, thermometer, condenser and gas sparger situated near the bottom of the flask. The flask is heated with reflux to 80° C. and is then charged with chlorine. Chlorination is effected by passing chlorine (at about 25° C. and 800 mm. Hg. absolute pressure) through the flask at the rate of about 1–20 ml./min. over a period of 30 minutes. The temperature is maintained within the range between about 70°–75° C. Samples of chlorinated copolymer are taken after ten and twenty minutes. The last sample is taken after 30 minutes. The last sample has a chlorine content of about 21.97 wt.%. The solvent and unreacted chlorine of the sample was removed by evaporation over a steam bath with nitrogen sparging.

EXAMPLE 2

In the manner of Example 1, an ethylene-vinyl acetate copolymer sold under the tradename AC-G-201 by Allied Chemical Company is chlorinated, sampled and isolated. The copolymer has a molecular weight of about 2000 and contains 7.5 wt.% vinyl acetate. The copolymer is chlorinated as follows: 8 grams of the copolymer and 200 ml of carbon tetrachloride are placed in a 500 ml flask. The copolymer is chlorinated by passing chlorine gas through the flask as in Example 1. The chlorinated copolymer is recovered after 30 minutes. The last sample has a chlorine content of about 18.77%.

EXAMPLE 3

The halogenated and non-halogenated polymers of Examples 1 and 2 are individually blended with a typical middle distillate fuel in order to demonstrate the improvement obtained by the utilization of the halogenated polymers of this invention. The middle distillate fuel used in this example contains both virgin and cracked distillate, has a boiling point range of 375°–650° F., a pour point of +15° F., and a cloud point of +20° F. The results are tabulated below in Table I.

TABLE I.

| POUR DEPRESSANT ACTIVITY IN MIDDLE DISTILLATE FUEL | |
|---|---|
| 0.05 Wt.% Additive in Fuel | ASTM Pour Point ° F. |
| No additive | +15 |
| Ethylene-Isobutyl Acrylate | |
| Copolymer of Example 1 | +10 |
| Chlorinated Ethylene-Isobutyl Acrylate Copolymer of Ex. 1 | |
| a. 10 minute sample of Ex. 1 | +10 |
| b. 20 minute sample of Ex. 1 | +10 |
| c. 30 minute sample of Ex. 1 | −20 |
| Ethylene-Vinyl Acetate Copolymer of Example 2 | −10 |
| Chlorinated Ethylene-Vinyl Acetate Copolymer of Example 2 | |
| a. 10 minute sample of Ex. 2 | −10 |
| b. 20 minute sample of Ex. 2 | −30 |
| c. 30 minute sample of Ex. 2 | −35 |

Although the invention has been described with some degree of particularity, it will be understood that variations and modifications can be made therein without departing from the spirit of the invention as hereinafter claimed.

What is claimed is:

1. A fuel oil composition of improved low temperature flow properties which comprises a major proportion of a middle distillate fuel and about 0.005 to 0.15 weight percent of a low temperature flow improver which is a copolymer which has been chlorinated so as to contain between about 5 to 25 wt. % chlorine, said copolymer having a number average molecular weight in the range of about 1500 to 20,000, said copolymer being improved in its flow improving properties by said chlorination, said copolymer consisting essentially of about 75 to 95 mole % of ethylene and at least one polar free-radical polymerizable comonomer selected from the group consisting of:

vinyl alcohol carboxylic acid esters, acrylates, α-alkyl acrylates, itaconates, maleates, fumarates, all of the general formula:

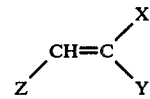

wherein,

Z is a hydrogen atom or —COOR′;
X is a hydrogen atom or a $C_1$ to $C_8$ alkyl group;
Y is a —OOCR or —COOR′ group;
R is a hydrogen atom or a $C_1$ to $C_8$ alkyl group; and
R′ is a $C_1$ to $C_8$ hydrocarbyl group.

2. A composition as defined in claim 1 wherein said chlorine is present in an amount ranging from 10 to 22 by weight.

3. A composition as defined by claim 1 wherein said fuel oil consists essentially of said middle distillate fuel, the amount of said chlorinated copolymer is about 0.01 to 0.15 wt. %, and said chlorinated polymer has a number average molecular weight within the range between 3500 and 15,000.

4. A composition as defined by claim 1, wherein said comonomer is vinyl acetate.

5. A composition as defined by claim 1, wherein said comonomer is isobutyl acrylate.

6. An oil concentrate consisting essentially of from about 10 to about 85 wt. % of a hydrocarbon solvent and from about 15 to about 90 wt. % of a middle distillate fuel cold flow improver which is a copolymer which has been chlorinated so as to contain between about 5 to 25 wt. % chlorine, said copolymer having a number average molecular weight in the range of about 1500 to 20,000, said copolymer being improved in its flow improving properties by said chlorination, said copolymer consisting essentially of about 75 to 95 mole % of ethylene and at least one polar free-radical polymerizable comonomer selected from the group consisting of:

vinyl alcohol carboxylic acid esters, acrylates, α-alkyl acrylates, itaconates, maleates, fumarates, all of the general formula:

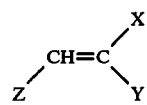

wherein,
Z is a hydrogen atom or —COOR';
X is a hydrogen atom or a $C_1$ to $C_8$ alkyl group;
Y is a —OOCR or —COOR' group;
R is a hydrogen atom or a $C_1$ to $C_8$ alkyl group; and
R' is a $C_1$ to $C_8$ hydrocarbyl group.

7. An oil concentrate according to claim 6, wherein said chlorine is present in an amount ranging from 10 to 22 wt. % and said molecular weight is about 3500 to 15,000.

8. An oil concentrate according to claim 7, wherein said comonomer is vinyl acetate.

9. An oil concentrate according to claim 7, wherein said comonomer is isobutyl acrylate.

* * * * *